G. Jones.

Churn.

Nº 90,665. Patented Jun. 1, 1869.

Witnesses
Omar H Simonds
Edward Taggart

Inventor
Gaylord Jones

United States Patent Office.

GAYLORD JONES, OF GRAND RAPIDS, MICHIGAN, ASSIGNOR TO HIMSELF AND JAMES C. STEWART, OF SAME PLACE.

Letters Patent No. 90,665, dated June 1, 1869.

IMPROVEMENT IN CHURNS.

The Schedule referred to in these Letters Patent and making part of the same.

*To all whom it may concern:*

Be it known that I, GAYLORD JONES, of the city of Grand Rapids, county of Kent, and State of Michigan, have invented a new and useful Atmospheric Churner; and I do hereby declare that the following is a full, clear, and exact description thereof, reference being had to the accompanying drawings, in which—

The same are made a part of these specifications.

My invention has for its object to produce a combination of devices to effect the churning of butter, by means of the introduction of air into any suitable vessel containing milk or cream, and to this end I construct the apparatus hereinafter described.

Figure 1:
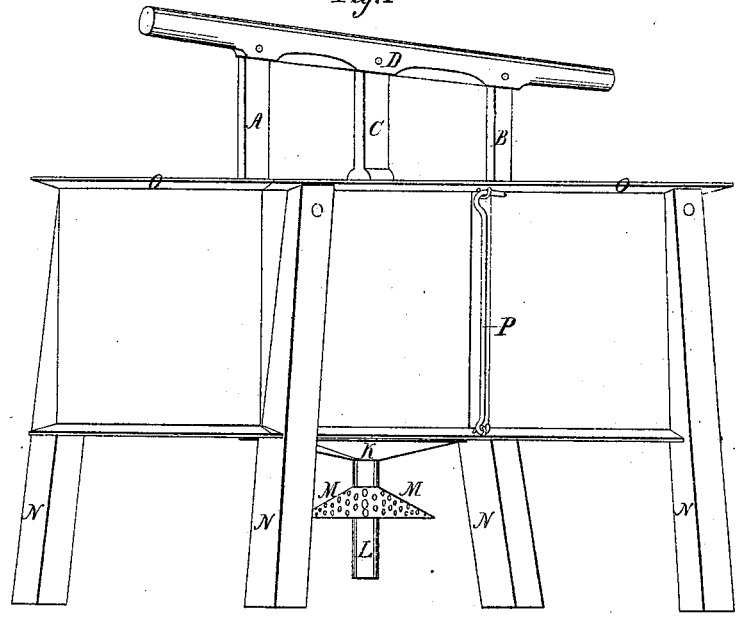
Figure 1 is an upright and perspective view of my invention.
Figure 2:
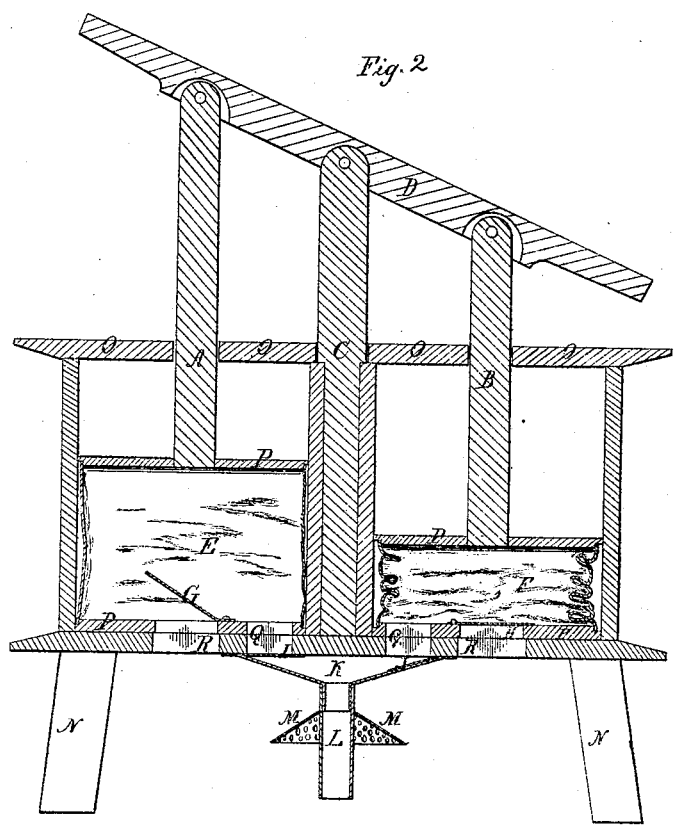
Figure 2 is an elevated view of a longitudinal section thereof.

The device I have invented consists of two bellows, supported by a frame-work and legs, and worked by the alternate raising and lowering of the lever D, as shown in fig. 2. It is composed of a body, in two compartments, and supported by legs.

The bellows are shown in fig. 2 by E and F, and they are made of leather, which is nailed to the edge of top and bottom pieces P, rabbeted for that purpose, which are made of such size as to move easily in the compartments in which they are placed.

The lower pieces are fastened to the body of the machine, by means of screws, inserted from beneath.

Each bellows is furnished with two valves, G I and H J, one opening upward and the other downward.

As the bellows E is raised, air is drawn into it through the receiving-passage R, which is usually an inch-auger hole, the valve G being raised.

When the bellows is compressed, as shown by F, the receiving-passage is closed by the valve H covering it, and the air is forced out through the discharging-passage Q, the valve J being depressed.

It will thus be seen, that by operating the machine a constant flow of air will be forced into the space K, and thence downward through the tube L.

K is a funnel-shaped piece of tin, attached to the body of the machine, and extends downward an inch or thereabouts, in the form of a tube.

The tube L and perforated cone M are made of tin, and the latter should be of such size as to nearly fill the vessel containing the milk or cream to be churned. It is used to prevent spattering.

For ordinary purposes, the case enclosing each bellows should be about six inches by eight inches, and five inches deep. The valves are made of leather, or other suitable material, and the body and legs of the machine of wood.

C is a fixed standard, upon which the lever D plays, and

A B are the rods, which attach the lever to the bellows.

The top, O, is held to its place by the hook P.

To use my invention, I place it over a churn or other receptacle containing cream or milk, and insert the tube L in the receptacle, so that its lower end will reach within about two inches of the bottom.

The perforated cone M, which is attached to the upper end of the tube, should be placed at or near the surface of the cream or milk.

The tube L should be about one-half inch in diameter, and is made to fit closely to the outside of the tube-part of the funnel-shaped tin K.

I use no other means for bringing butter than the forcing a current of air into the vessel containing the milk or cream to be churned, at or near the bottom, and allowing it to rise to the surface and escape.

I am well aware of the patent granted to Robert McCutcheon, for an atmospheric churn, June 2, 1857, and this I do not claim; but

What I claim as new, and desire to secure by Letters Patent, is—

1. The apparatus, consisting of the bellows E F, operated by means of lever D and arms A B, valves G H I J, and funnel K, when operating to churn cream in any vessel, independent of and separate from the above apparatus, as and for the purposes described.

2. In combination with the above, the perforated cone M, substantially as and for the purposes set forth.

In testimony that I claim the above, I have hereunto set my hand and seal, this 15th day of August, A. D. 1868.

GAYLORD JONES. [L. S.]

Witnesses:
 OMAR H. SIMONDS,
 EDWARD TAGGART.